Figure 1:
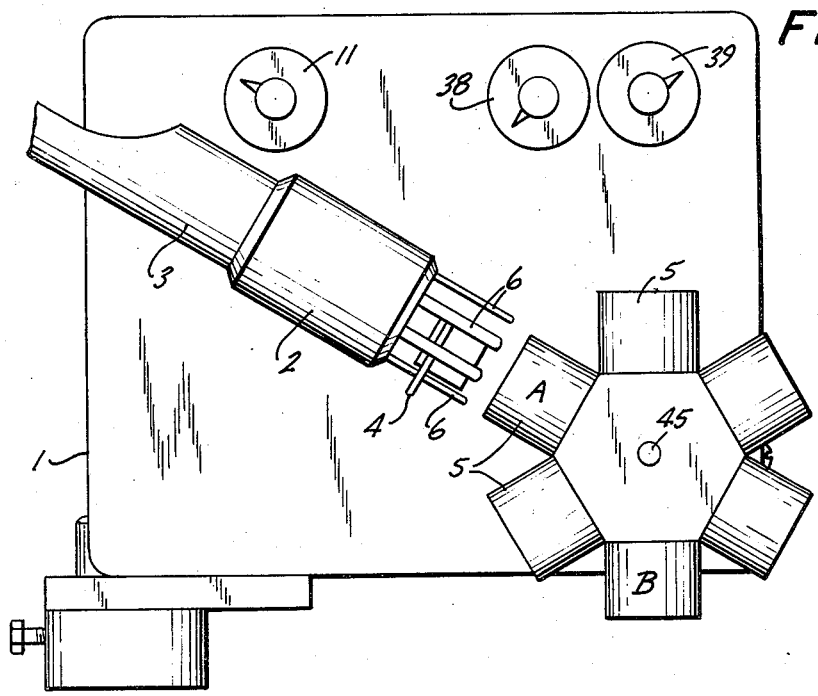

Sept. 29, 1959  W. J. HAWES  2,906,071
APPARATUS FOR LOCATING CAPSULES ON THE NECKS OF BOTTLES
Filed Oct. 11, 1955  6 Sheets-Sheet 1

INVENTOR.
WALTER JOHN HAWES
BY MICHAEL S. STRIKER
ATTORNEY.

Sept. 29, 1959 W. J. HAWES 2,906,071
APPARATUS FOR LOCATING CAPSULES ON THE NECKS OF BOTTLES
Filed Oct. 11, 1955 6 Sheets-Sheet 2

Inventor:
Walter John Hawes
By: Michael S. Striker
agt.

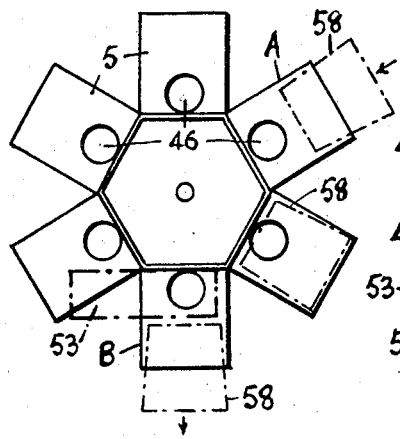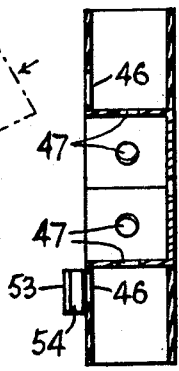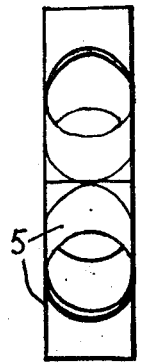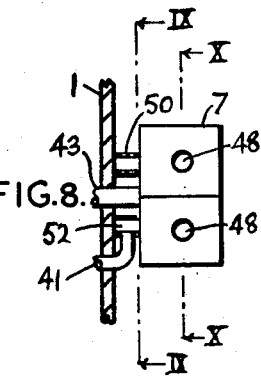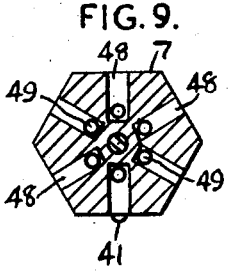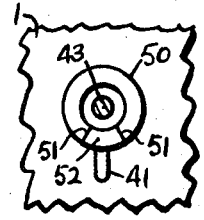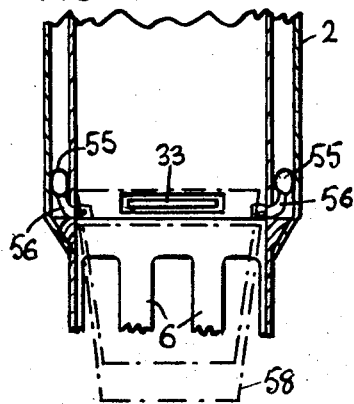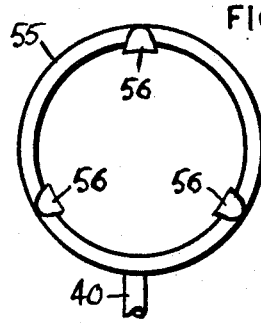

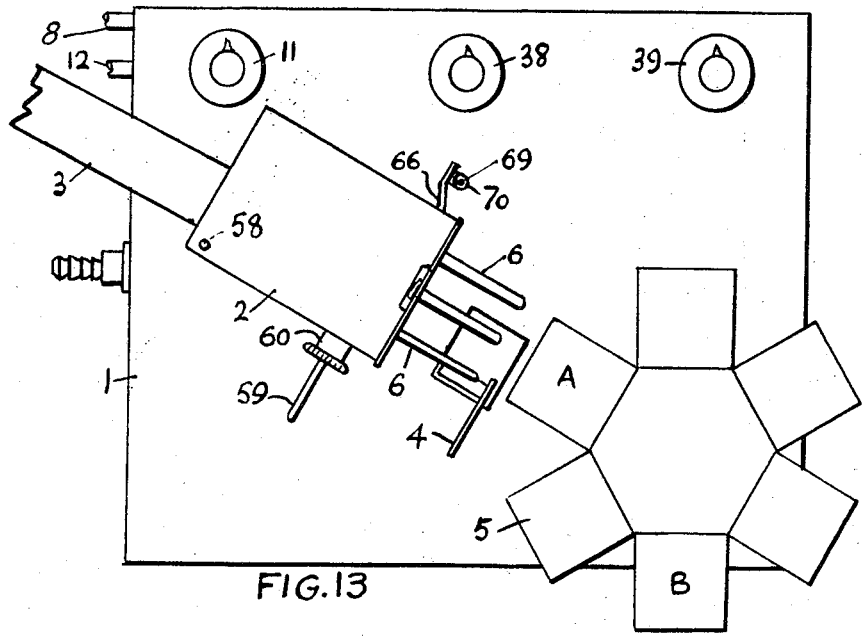
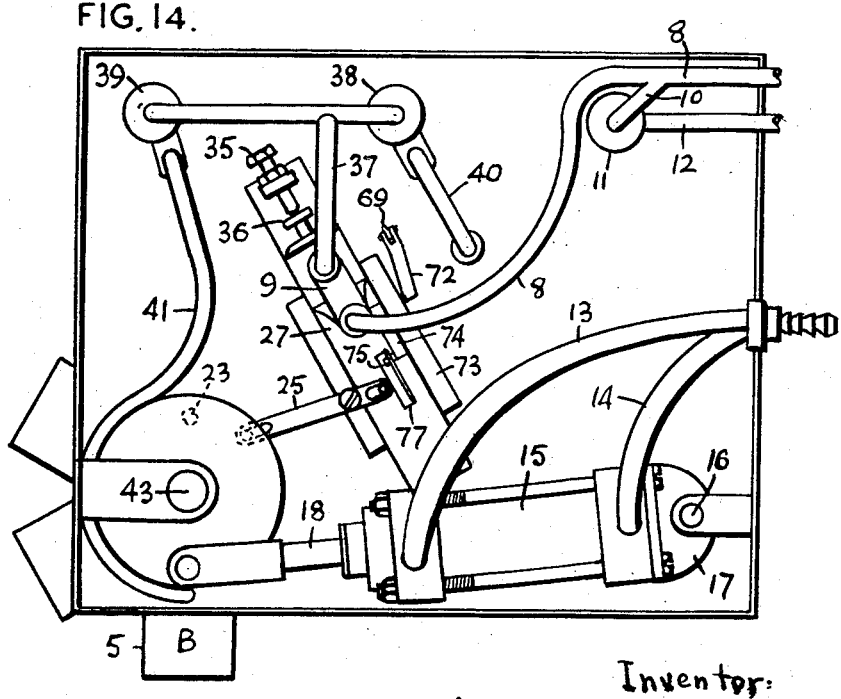

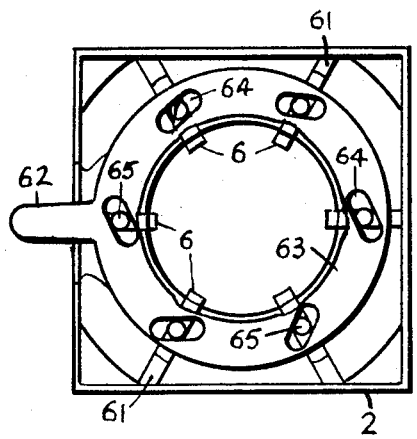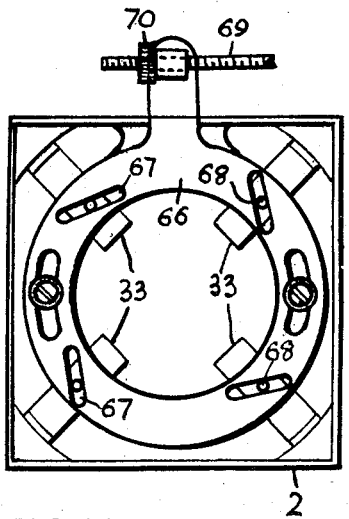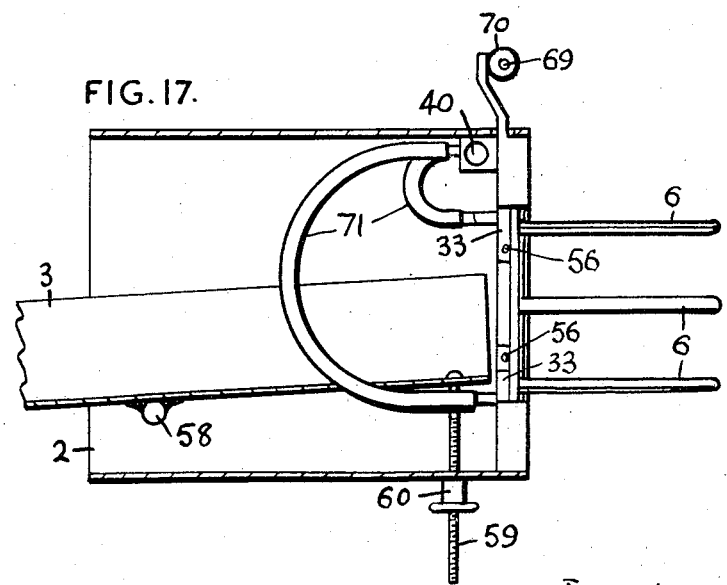

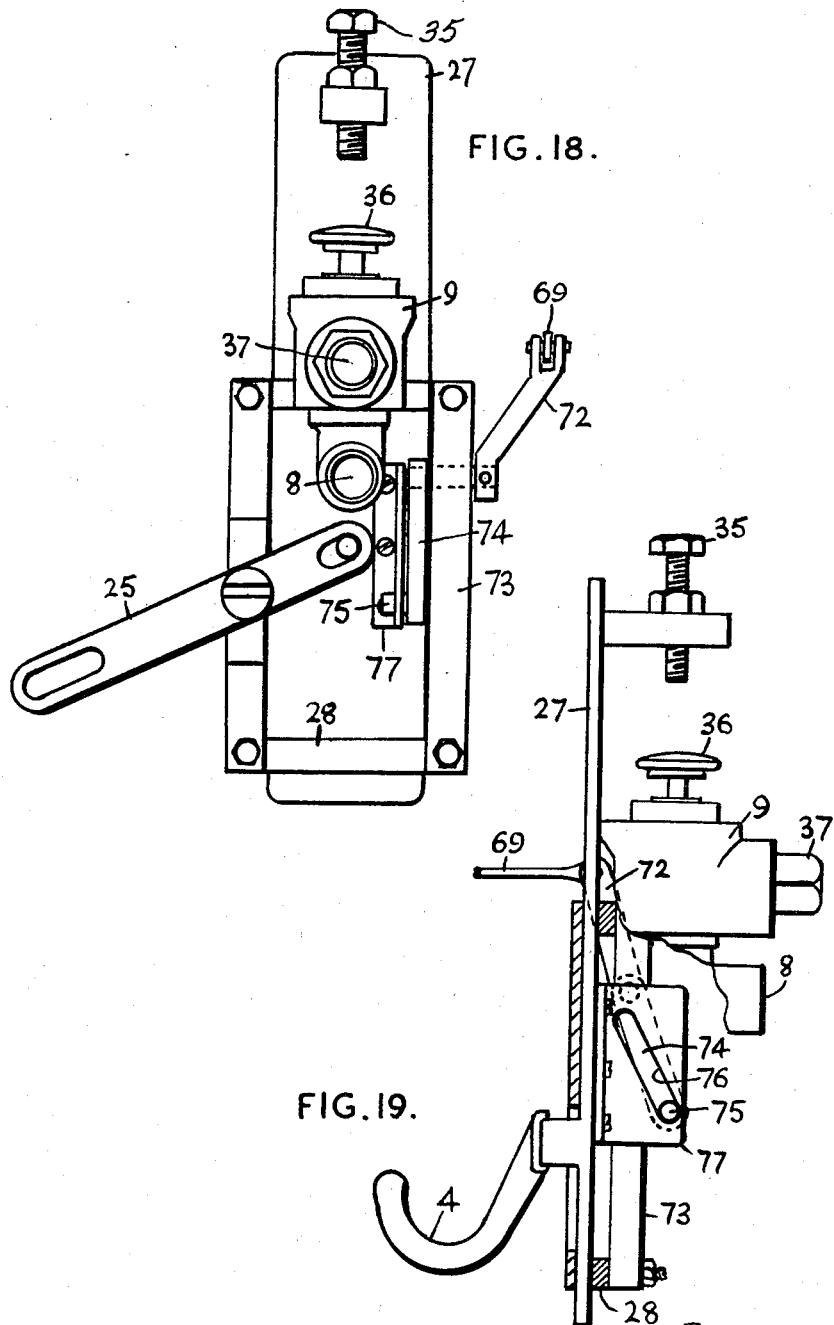

2,906,071
APPARATUS FOR LOCATING CAPSULES ON THE NECKS OF BOTTLES

Walter John Hawes, Holloway, London, England, assignor to Betts and Company Limited, London, England, a British company Application October 11, 1955, Serial No. 539,797

Claims priority, application Great Britain October 22, 1954

9 Claims. (Cl. 53—67)

This invention relates to a method and apparatus for locating capsules, as for example pleated metal capsules, on the necks of bottles and has for its object to provide an improved method and apparatus for the said purpose.

Such capsules are usually supplied to the bottlers in "sticks," i.e. a large number of capsules nested one within another. Such capsules must be disengaged singly from a stick of capsules and placed on the neck of a bottle before the latter is conveyed into a capsuling machine by which the capsule is squeezed around the neck of the bottle.

Hitherto the only satisfactory method of locating capsules on the necks of bottles has been by hand, and this involves the expenditure of unnecessary time and labour.

According to the present invention a method of locating a capsule on the neck of a bottle consists in arranging a stick of capsules in inverted position and at an angle to the horizontal (i.e. vertically or, preferably, inclined), preventing movement of all of the capsules except the lowermost capsule while the lowermost capsule is blown by a jet of fluid, preferably air, into a receptacle, partially rotating the receptacle to bring the capsule head upwards vertically above the neck of a bottle and causing said capsule to leave the receptacle and fall onto the neck of the bottle.

The preferred method of operation is as follows:

A stick of inverted capsules is placed in an inclined chute so that the stick moves downwardly by gravitation until the lowermost capsule of the stick abuts against a retractable stop (which may be adjustable). At a suitable time, which is preferably determined by the movement of a bottle into the appropriate bottle station, the said stop is retracted while simultaneously at least one friction pad (which may also be adjustable) is pressed lightly against the stick above the lowermost capsule so that all the capsules except the lowermost capsule are held against downward movement. A blast of air is then directed downwardly at the edge of the lowermost capsule, whereby the said capsule is disengaged from the stick and is forced into a cup located in line with the same.

The said cup is one of a plurality of cups arranged around a rotatable boss in such manner that while one cup is in line with the stick of capsules, another cup is vertically above the said bottle station. The internal diameter of each cup may be slightly less than the external diameter of the skirt of the capsule so that the capsule is held by friction within the cup or, alternatively, the cup may have an internal diameter greater than the external diameter of the capsule and the latter held therein by suction. In the former case the cup assembly is made interchangeable or adjustable to accommodate different sizes of capsule.

The cup assembly may be rotated by means of a ratchet and pawl operated by a double-acting air cylinder.

At the same time as the capsule is being blown from the lower end of the stick into a cup, the capsule in the cup which is vertically above the bottle station is blown from the cup by a blast of air (in the case when the capsule is a tight fit in the cup) or allowed to fall by discontinuing the suction (in the case when the capsule is a loose fit in the cup) and comes to rest on the neck of the bottle.

After the capsule has left the lower end of the stick and has been blown into the cup, the retractable stop is returned to its operative position and the friction pad is drawn back, thus allowing the stick of capsules to move down by gravity ready for the same cycle to recommence.

The cycle is preferably initiated by a bottle as it arrives on a conveyor at the bottle station immediately below the lowermost cup. The bottle may for example depress a spring-loaded two-way air valve mounted on the framework of the conveyor. The compressed air thus released may move the piston of the air cylinder forward whereby the friction pad is brought into position, the stop retracted and pressure applied to a second spring-loaded air valve which provides the air blast for removing the lowermost capsule and also for the ejection of the capsule from the cup immediately above the bottle station. When the bottle has left the bottle station and allowed the spring-loaded two-way air valve to return to its original position, the piston of the air cylinder is retracted and this closes the second air valve, returns the stop to its operative position and removes the pressure on the friction pad, thus allowing the stick of capsules to move downwardly to bring the lowermost capsule into contact with the stop and into the position for removal. The mechanism is then ready for another bottle to initiate the same cycle again.

The invention also comprises apparatus for locating a capsule on the neck of a bottle comprising means, such as a chute, down which a stick of inverted capsules can slide by gravity, a retractable stop which is contacted by the lowermost capsule, means for retracting said stop, a friction pad, means for moving said friction pad into contact with said stick to hold all said capsules except the lowermost capsule against downward movement, means for directing at least one downward blast of fluid onto the skirt of the lowermost capsule, a plurality of cups mounted around a rotatable boss, means for rotating each cup from a position in line with said stick of capsules into a position immediately above a bottle station, means for moving a bottle into said bottle station and means for causing a capsule in the cup immediately above the bottle to fall onto the neck of the bottle.

Figure 3:
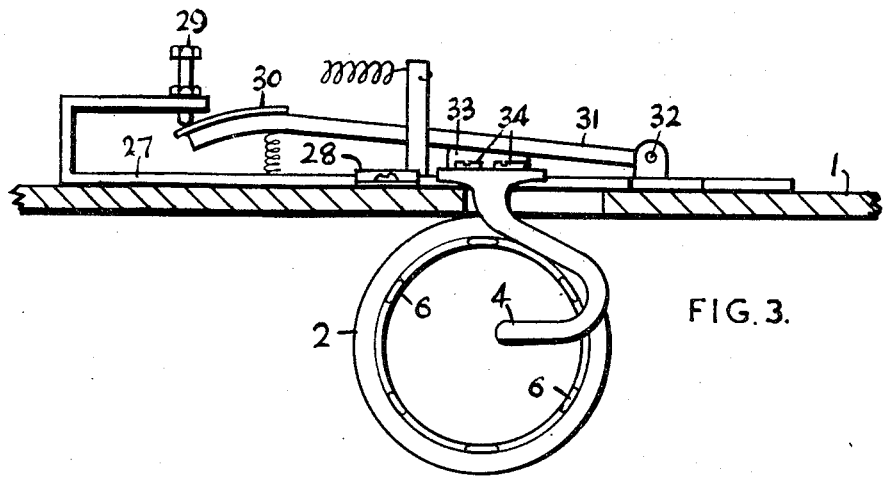
Figure 4:
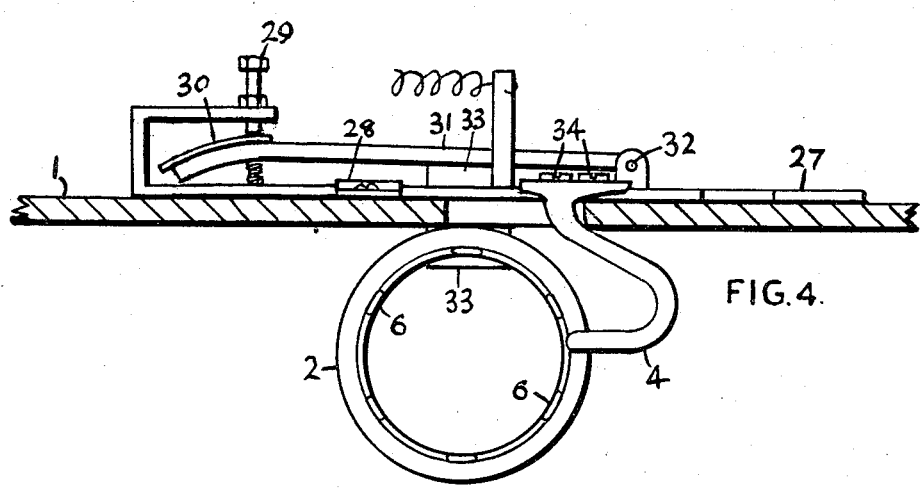

The invention will now be described in greater detail with reference to the accompanying drawings in which two embodiments of the invention are illustrated by way of example. In the drawings, Figure 1 is a front elevation of one embodiment of apparatus according to this invention, Figure 2 is a rear elevation of Figure 1, Figures 3 and 4 are details illustrating the action of the retractable stop and friction pad, Figures 5 to 10 are details illustrating the insertion of capsules into the rotating cup assembly and the removal of the same therefrom, Figures 11 and 12 are details illustrating the air jets for removing the lowermost capsule from the stick, Figure 13 is a front elevation of a second embodiment of the invention, Figure 14 is a rear elevation of Figure 13, and Figures 15 to 19 are details illustrating the adjustment of the guide rails and friction pads to suit different sizes of capsule.

Referring first to Figures 1 to 12, a frame 1 has mounted thereon a holder 2 for a chute 3 which chute is adapted to hold a stick of capsules (not shown). The stick of capsules slides down by gravity and the lowermost capsule rests against a retractable stop 4. At an appropriate time, the stop 4 is retracted and the lowermost capsule of the stick is blown into one of six cups 5 which is occupying position A (all as described later). Guide rails 6, secured to the holder 2, guide the capsule into the appropriate cup 5. As will be described later, the cups 5 are moved so that each in turn is brought into position A where it receives a capsule, and then in two further stages into position B where the capsule is ejected from the cup onto the neck of a bottle situated below the same.

Figure 2:
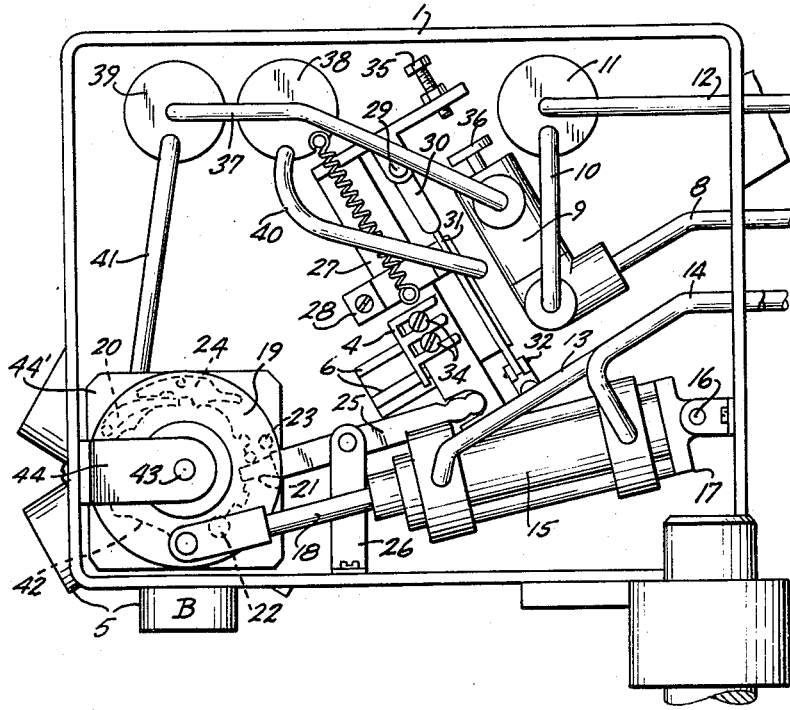

Referring more particularly to Figure 2, the assembly of cups 5 is mounted on a boss 7 (see Figure 8) which is caused to rotate stepwise as follows: An air supply pipe 8 is connected to a source of compressed air. The pipe 8 supplies air to a spring-loaded air valve 9 and also, through pipe 10, air regulating valve 11 and pipe 12, to a trigger valve (not shown). The trigger valve may be operated manually but it is preferred that it should be actuated by a bottle as it moves into a position vertically below the cup 5 in position B. The trigger valve is connected by pipes 13 and 14 to a double-acting cylinder 15 which is pivoted to the frame 1 at 16 by means of a trunnion 17. The piston 18 of the cylinder 15 is pivoted to a pawl plate 19 which is free to rotate and which carries a pawl 20 and pins 21, 22 and 23. When the trigger valve is actuated manually or by a bottle moving into position beneath a cup in position B, air passes from the trigger valve through pipe 13 to the cylinder 15 and the piston 18 is retracted thereby rotating the pawl plate 19 in an anticlockwise direction as viewed in Figure 2 and carrying the pawl 20 and pins 21, 22 and 23 with it. During this movement the pin 23 lifts the heel of a ratchet locking stop 24 and the pin 22 causes a toggle lever 25, pivoted on a toggle bracket 26 secured to the frame 1, to move a slide 27 downwards between a guide 28 and the frame 1. As the result of this downward movement of the slide 27, an adjustable striker 29 carried thereby contacts a cam surface 30 mounted on an arm 31 pivoted to the frame 1 at 32. A friction pad 33 mounted on the arm 31 is thereby pressed lightly against the capsule immediately above the lowermost capsule in the stick, whereby all the capsules except the lowermost capsule are held against downward movement. At the same time the capsule stop 4, which is adjustably mounted on the slide 27 by means of screws 34, is retracted by the movement of the slide 27 so that the stop no longer obstructs downward movement of the lowermost capsule. The downward movement of the slide 27 also causes another adjustable striker 35 mounted thereon to contact a spring-loaded member 36 which actuates the air valve 9 to allow compressed air to flow through a pipe 37 to two regulating valves 38 and 39 and thence through pipes 40 and 41 for the purpose of blowing the lowermost capsule into the cup 5 at position A and the capsule out of the cup in position B, as hereinafter described. When actuation of the trigger valve is discontinued, either manually or because a bottle has passed beyond the trigger valve, air passes through pipe 14 to the cylinder 15 and the piston 18 moves outwardly thereby returning the pawl plate 19 to its original position. The pawl 20 engages a ratchet wheel 42 which is keyed to the spindle 43 on which the boss 7 is mounted, and the spindle is thus rotated in bearing blocks 44, thereby also rotating the assembly of cups 5 mounted on the boss 7 and held thereon by a retaining screw 45. Movement of the pin 23 releases the heel of the locking stop 24 so that the stop can engage with the ratchet wheel 42 thus accurately locating the position of the cup assembly. At the same time, pin 21 engages the toggle lever 25 to move the slide 27 upwards, thereby returning the stop 4 to its original position and withdrawing the friction pad 33 from contact with the stick of capsules which is thus allowed to slide by gravity until the lowermost capsule is in contact with the stop 4. The cycle is then repeated for the next bottle.

The position of the stop 4 can be adjusted by means of the screws 34 to accommodate capsules of different lengths.

Referring more particularly to Figures 5 to 10, each cup 5 has an aperture 46 at the rear thereof. This is provided to avoid the formation of a cushion of air beneath the capsule when it is blown into the cup at position A, which cushion might prevent proper seating of the capsule in the cup and allow it to fall out prematurely either at position B or at the position intermediate between A and B.

The base of each cup 5 is also provided with an aperture 47 which coincides with the mouth of a bore 48 drilled radially into the boss 7. Each bore 48 is connected to the rear face of the boss 7 by another bore 49 perpendicular thereto. The rear face of the boss 7 rides against an annular bearing surface 50 the lower part of which is isolated by partitions 51 to provide a small chamber 52 which is in communication with the air pipe 41 and with the lowermost bore 49. Secured to the frame adjacent the lowermost position B of the cups 5 is a resilient arm 53 provided with a felt pad 54 which is adapted to obturate the lowermost aperture 46. Thus when air is blown through the pipe 41 (as above described) it passes into the chamber 52, through bores 49 and 48 and the aperture 47 into the lowermost cup 5 behind the capsule therein and since the air cannot pass out through the aperture 46 it forces the capsule out from the cup 5 onto the neck of a bottle positioned immediately beneath the same.

Referring to Figures 11 and 12, the holder 2 contains an annular pipe 55 communicating with the pipe 40 and provided with three jets 56 adapted to direct jets of air at a point slightly above the lowermost capsule 58. When, as described above, air is supplied to the pipe 40, it passes into the annular pipe 55 and out through the jets 56, thereby blowing the lowermost capsule 58 down into the cup 5 in position A; the pad 33 prevents the downward movement of the other capsules.

In Figures 13 to 19 the same reference numerals have been used for the same items as far as possible and the apparatus is in general very similar to that of Figures 1 to 12, except that provision is made for adjusting the guide rails, friction pads and chute to render them suitable for different sizes of capsule.

Referring especially to Figures 13 and 17, the holder 2 is rectangular in cross-section and the chute 3, instead of being circular in cross-section, is in the form of a V-channel which is pivoted to the holder 2 at 58 and is capable of being swung about said pivot by means of a threaded rod 59 and adjusting nut 60 so that the chute properly delivers capsules to the guide rails 6.

Referring especially to Figures 13, 15 and 17, the guide rails 6 are also adjustable to suit capsules of different diameters. The guide rails 6 are movable in slideways 61 in which they can be moved backward or forward by means of a lever 62 through the agency of a ring 63 provided with oblique slots 64 which engage with pins 65 on the guide rails 6.

The single friction pad 33 of Figures 1 to 12 is replaced (see Figures 16 and 17) by four pads 33 which are capable of being moved inwards to grip a capsule by rotation of a ring 66 having oblique slots 67 which engage pin 68 mounted on the pads 33. The ring 66 is rotated by means of a threaded rod 69 and the extent to which the pads move inwards can be adjusted by means of an adjusting nut 70 to suit the diameter of the capsules being used.

The air jets 56 in this embodiment are formed within the pads 33 and air is supplied to the jets 56 from the pipe 40 by means of flexible pipes 71 which may be made of plastic.

The manner in which the rod 69 is actuated will now be described with reference to Figures 14, 18 and 19 in particular. The rod 69 passes through the frame 1 and is pivoted to one arm 72 of a double lever which is journalled in a bracket 73 secured to the frame 1. The other arm 74 of the double lever carries a pin 75 which engages in a slot 76 in a cam plate 77 carried by the slide 27. As the slide 27 is moved down by the toggle lever 25, the slot 76 in the cam plate 77 depresses the arm 74 by pressure upon the pin 75 and the arm 72 is thereby raised to exert a pull upon the rod 69 which, as above described, effects inward movement of the pads 33 to grip a capsule.

I claim:

1. Apparatus for locating a capsule on the neck of a bottle comprising in combination, a holder; a chute pivotally mounted on said holder for slidably retaining a stick of inverted capsules; guide rails mounted on said holder, said chute being pivotable to feed capsules accurately to said guide rails; a retractable stop which is contacted by the lowermost capsule in said stick; means for retracting said stop; at least one friction pad; means for moving said friction pad into contact with said stick to hold all of said capsules except the lowermost capsule against downward movement; means for directing at least one downward blast of fluid onto the skirt of the lowermost capsule; a plurality of cups fixedly mounted around a rotatable boss; said guide rails being carried by said holder for directing a capsule into one of said cups; means for rotating each cup from a position in line with said stick of capsules into a position immediately above a bottle station; means for moving a bottle into said bottle station; and pneumatic means for causing a capsule in the cup immediately above the bottle to fall onto the neck of the bottle.

2. Apparatus as claimed in claim 1, including means for adjusting said guide rails, whereby the guide rails are adjustable for the reception of capsules of different diameters.

3. Apparatus as claimed in claim 1 comprising a double-acting air cylinder which when actuated acts to retract the retractable stop, to press the friction pad against the stick of capsules, to direct a jet of fluid towards the lowermost capsule and to direct another jet of fluid into the cup above said bottle station to eject the capsule therein, and which when returned ot its original position acts to effect partial rotation of the boss carrying the plurality of cups.

4. Apparatus as claimed in claim 3 comprising means operated by the movement of a bottle into said bottle station to actuate said double-acting air cylinder.

5. Apparatus as claimed in claim 4 wherein the partial rotation of the boss is effected by a pawl and ratchet mechanism associated with the air cylinder.

6. Apparatus as claimed in claim 1 comprising means for adjusting the position of each friction pad to accommodate capsules of different diameters.

7. Apparatus for locating a capsule on the neck of a bottle comprising, in combination, means for slidably retaining a stick of inverted capsules; a retractable stop which is contacted by the lowermost capsule in said stick; said stop being adjustable to accommodate capsules of different lengths; means for retracting said stop; at least one friction pad; means for moving said friction pad into contact with said stick to hold all of said capsules except the lowermost capsule against downward movement; means for directing at least one downward blast of fluid onto the skirt of the lowermost capsule; a plurality of cups fixedly mounted around a rotatable boss; means for rotating each cup from a position in line with said stick of capsules into a position immediately above a bottle station; means for moving a bottle into said bottle station; and pneumatic means for causing a capsule in the cup immediately above the bottle to fall onto the neck of the bottle.

8. Apparatus for locating a capsule on the neck of a bottle comprising, in combination, means for slidably retaining a stick of inverted capsules; a retractable stop which is contacted by the lowermost capsule in said stick; means for retracting said stop; at least one friction pad; means for moving said friction pad into contact with said stick to hold all of said capsules except the lowermost capsule against downward movement; means for directing at least one downward blast of fluid onto the skirt of the lowermost capsule; a plurality of cups fixedly mounted around a rotatable boss, each cup being provided with an aperture at the rear; means for rotating each cup from a position in line with said stick of capsules into a position immediately above a bottle station; means for moving a bottle into said bottle station; a pad mounted on a resilient arm and arranged adjacent said bottle station so that said pad obturates said aperture in the cup at the bottle station; and pneumatic means for causing a capsule in the cup immediately above the bottle to fall onto the neck of the bottle.

9. Apparatus for locating a capsule on the neck of a bottle comprising, in combination, a holder; a chute and guide rails mounted on said holder; means for slidably retaining a stick of inverted capsules; a retractable stop which is contacted by the lowermost capsule in said stick; means for retracting said stop; at least one friction pad; means for moving said friction pad into contact with said stick to hold all of said capsules except the lowermost capsule against downward movement; means for directing at least one downward blast of fluid onto the skirt of the lowermost capsule; a plurality of cups fixedly mounted around a rotatable boss, said guide rails being carried by said holder for directing a capsule into one of said cups and being equally spaced from an axis; cam means for moving said guide rails respectively equal distances toward and away from said axis so as to adjust the guide rails for guiding caps of different diameters; means for rotating each cup from a position in line with said stick of capsules into a position immediately above a bottle station; means for moving a bottle into said bottle station; and pneumatic means for causing a capsule in the cup immediately above the bottle to fall onto the neck of the bottle.

References Cited in the file of this patent

UNITED STATES PATENTS

| | | |
|---|---|---|
| 1,470,348 | Clark | Oct. 9, 1923 |
| 1,919,060 | Harder | July 18, 1933 |
| 1,927,151 | Blasco | Sept. 19, 1933 |
| 2,600,138 | Tesch Jr. | June 10, 1952 |
| 2,734,657 | Drese | Feb. 14, 1956 |
| 2,738,899 | Hansen et al. | Mar. 20, 1956 |